US007540730B1

(12) United States Patent
Ouvahia et al.

(10) Patent No.: US 7,540,730 B1
(45) Date of Patent: Jun. 2, 2009

(54) TIRE MOLD

(75) Inventors: Yacine Ouvahia, Bereldange (LU); Nicolas Daniel Dumont, Ethe (BE); Christophe Jean Alexis Pierre, Aubange (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 12/259,521

(22) Filed: Oct. 28, 2008

Related U.S. Application Data

(60) Provisional application No. 61/015,369, filed on Dec. 20, 2007.

(51) Int. Cl.
*B29C 33/04* (2006.01)
*B29C 35/02* (2006.01)

(52) U.S. Cl. .................................. 425/40; 425/46
(58) Field of Classification Search ............ 425/40, 425/46
See application file for complete search history.

(56) References Cited

U.S. PATENT DOCUMENTS

| | | | | |
|---|---|---|---|---|
| 2,046,372 | A | * | 7/1936 | Engstrom ................. 425/40 |
| 2,185,542 | A | * | 1/1940 | Royal ...................... 425/40 |
| 2,932,853 | A | * | 4/1960 | Fike ........................ 425/17 |
| 3,154,814 | A | * | 11/1964 | Fike ........................ 425/40 |
| 3,833,323 | A | | 9/1974 | Pasch ...................... 425/47 |
| 3,910,735 | A | * | 10/1975 | Caretta ..................... 425/46 |
| 3,999,907 | A | * | 12/1976 | Pappas ..................... 425/46 |
| 4,515,541 | A | | 5/1985 | Salvadori .................. 425/47 |
| 4,553,930 | A | * | 11/1985 | Cox et al. .................. 425/40 |
| 4,580,959 | A | * | 4/1986 | Pizzorno et al. ............ 425/46 |
| 4,883,415 | A | * | 11/1989 | Salvadori .................. 425/46 |
| 5,120,209 | A | | 6/1992 | MacMillan ................ 425/40 |
| 5,585,064 | A | | 12/1996 | Moris-Herbeuval et al. . 264/501 |
| 5,639,326 | A | | 6/1997 | Soulalioux ................ 156/101 |
| 6,017,206 | A | | 1/2000 | Soulalioux ................ 425/35 |
| 6,413,068 | B1 | * | 7/2002 | Steidl et al. ............... 425/40 |
| 6,916,164 | B2 | | 7/2005 | Kasper et al. .............. 425/46 |
| 7,025,581 | B2 | | 4/2006 | Kata ........................ 425/46 |
| 2004/0207116 | A1 | | 10/2004 | Girard et al. .............. 264/326 |
| 2006/0008547 | A1 | | 1/2006 | Ohara ...................... 425/35 |

FOREIGN PATENT DOCUMENTS

WO 2006/070412 7/2006

OTHER PUBLICATIONS

European Search Report, completed Mar. 3, 2009.

* cited by examiner

*Primary Examiner*—James Mackey
(74) *Attorney, Agent, or Firm*—June E. Rickey

(57) ABSTRACT

A segmented mold comprising a plurality of segments is provided. The segments are arranged to form an annular cavity to mold a tire, the segments comprising an inner face for molding the tread, and an outer radial surface. The mold further includes a plurality of slide blocks located radially outwards of the segments. Each slide block may have flanged ends and an inner cavity for receiving a segment therein. One or more channels are provided between each segment outer surface and the adjacent slide block inner surface forming a fluid passageway, wherein each fluid passageway is joined together by a fluid connector to form a fluid manifold for circulating a fluid medium. Steam may be circulated in the fluid manifold during curing of the mold.

4 Claims, 7 Drawing Sheets

US 7,540,730 B1

TIRE MOLD

This application claims the benefit of, and incorporates by reference, U.S. Provisional Application No. 61/015,369 filed Dec. 20, 2007.

FIELD OF THE INVENTION

The present invention relates to a mold for a pneumatic radial tire, and more particularly, to a segmented tire mold.

BACKGROUND OF THE INVENTION

Tire molds for molding pneumatic tires are typically constructed of steel or aluminum, and heated by steam platens or by placing the molds in potheaters. Thermal conduction is usually relied upon to transfer the heat from the heat source to the tread and sidewall forming surfaces. It is desirable to maximize the heat conduction to the tread and sidewall forming surfaces. If the thermal conduction is less than optimum, it will require additional cure time and energy costs resulting in reduced production capacity for the mold and higher operating costs. Inefficient thermal conduction can also result in temperature non-uniformity in the mold. The time to cure a tire is limited by the point of least cure on the tire, which is typically located on the undertread or in the bead area. Thus if this area could be cured quicker, the entire time of the process may be reduced. Thus an improved mold is desired which can heat the tire more quickly, uniformly and efficiently.

SUMMARY OF THE INVENTION

The invention provides in a first aspect a segmented mold comprising a plurality of segments arranged to form an annular cavity to mold a tire, the segments comprising an inner face for molding the tread, and an outer radial surface; the mold further comprising a plurality of slide blocks located radially outwards of the segments; wherein or more channels are provided between each segment outer surface and the adjacent slide block inner surface forming a fluid passageway, wherein each fluid passageway is joined together by a fluid connector to form a fluid manifold for circulating a fluid medium.

The invention provides in a second embodiment a segmented mold comprising a plurality of segments arranged to form an annular cavity to mold a tire, the segments comprising an inner face for molding the tread, and an outer radial surface; the mold further comprising a plurality of slide blocks located radially outwards of the segments; wherein or more fluid passageways are provided internally within each segment, wherein each fluid passageway is joined together by a fluid connector to form a fluid manifold for circulating a fluid medium.

BRIEF DESCRIPTION OF THE DRAWINGS

The invention will be described by way of example and with reference to the accompanying drawings in which.

DEFINITIONS

"Axial" and "axially" means the lines or directions that are parallel to the axis of rotation of the tire or tire mold.

"Circumferential" means lines or directions extending along the perimeter of the surface of the annular tread mold perpendicular to the axial direction.

"Radial" and "radially" mean directions radially toward or away from the axis of rotation of the tire or tire mold.

"Sidewall" means a portion of a tire between the tread and the bead.

DETAILED DESCRIPTION OF THE INVENTION

Figure 1:
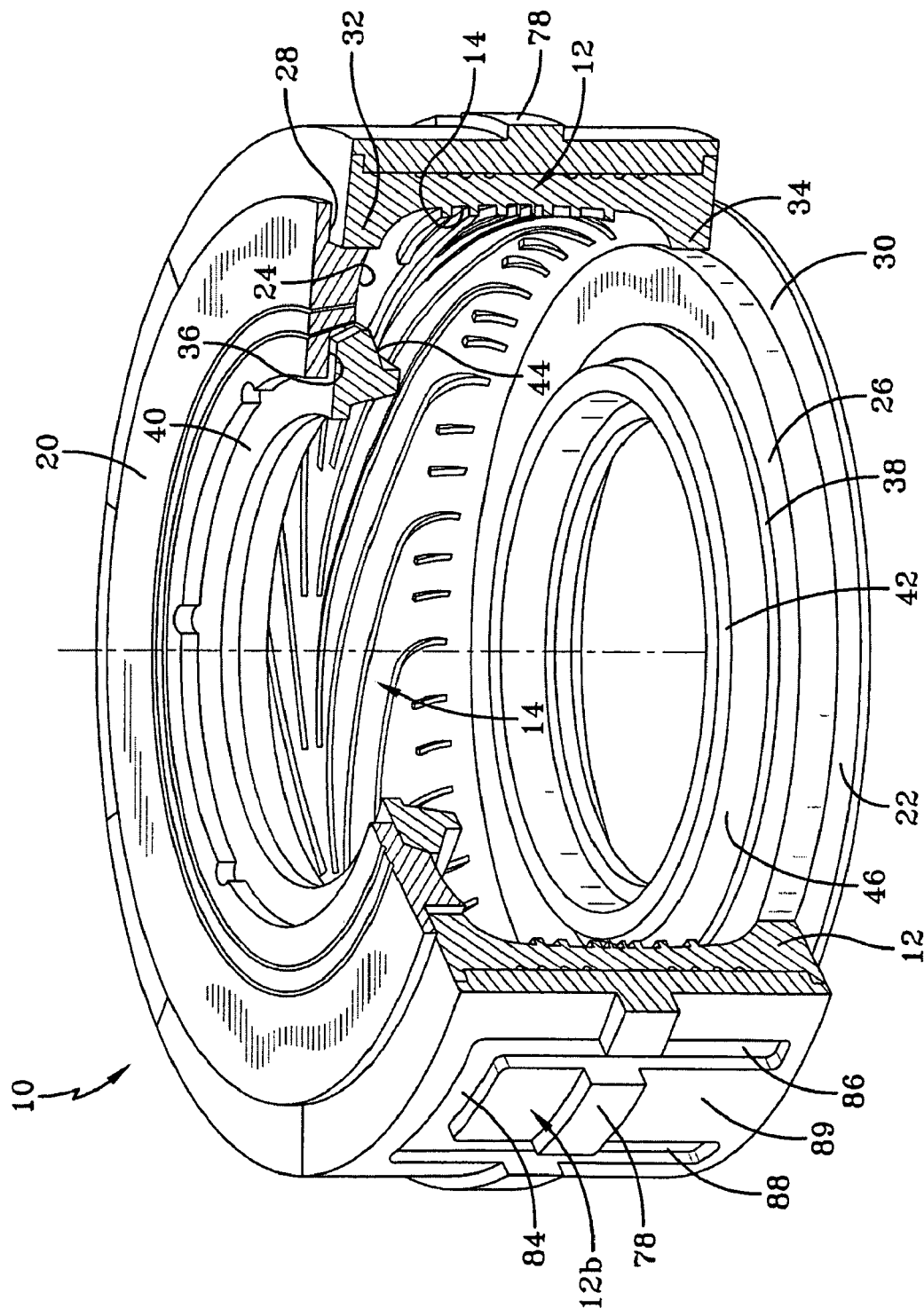
FIG. 1 is a partial cutaway view of a segmented mold assembly showing only the segments, sidewall plates and mold rings.

FIG. 1 illustrates a first embodiment of a mold assembly 10 of the present invention. The mold assembly 10 comprises a plurality of segments 12 which are arranged to form an annular ring when assembled together. The outer tread surface of a tire is formed by the inner molding surface 14 of the segments 12, which have a plurality of lands and grooves to mold the tread pattern in a green tire. The mold segments 12 may be radially movable to allow assembly and disassembly of the mold about a green tire.

The mold assembly 10 further comprises a first and second sidewall plate 20, 22 for molding the sidewalls of the tire (not shown). Each sidewall plate 20, 22 has an inner mold surface 24, 26 for molding the tire sidewall, and joins with the segments 12 to form a smooth continuous surface from the tire tread to the sidewall. Each sidewall plate 20, 22 may comprise an optional radially outer lip 28, 30 forming an L shaped recess for receiving a first and second flanged end 32, 34 of the segment therein. Each sidewall plate 20, 22 further comprises an optional radially inner extension or lip forming a second L shaped recess 36, 38 for receiving a mold bead ring 40, 42 therein. Each bead ring 40, 42 has a radiused portion 44, 46 for receiving a bead area of a green tire thereon. The upper and lower sidewall plate 20, 22 together with the plurality of tread segments 12 and the top and bottom bead rings 40, 42 cooperate to define a mold cavity for molding a green tire.

Figure 2:
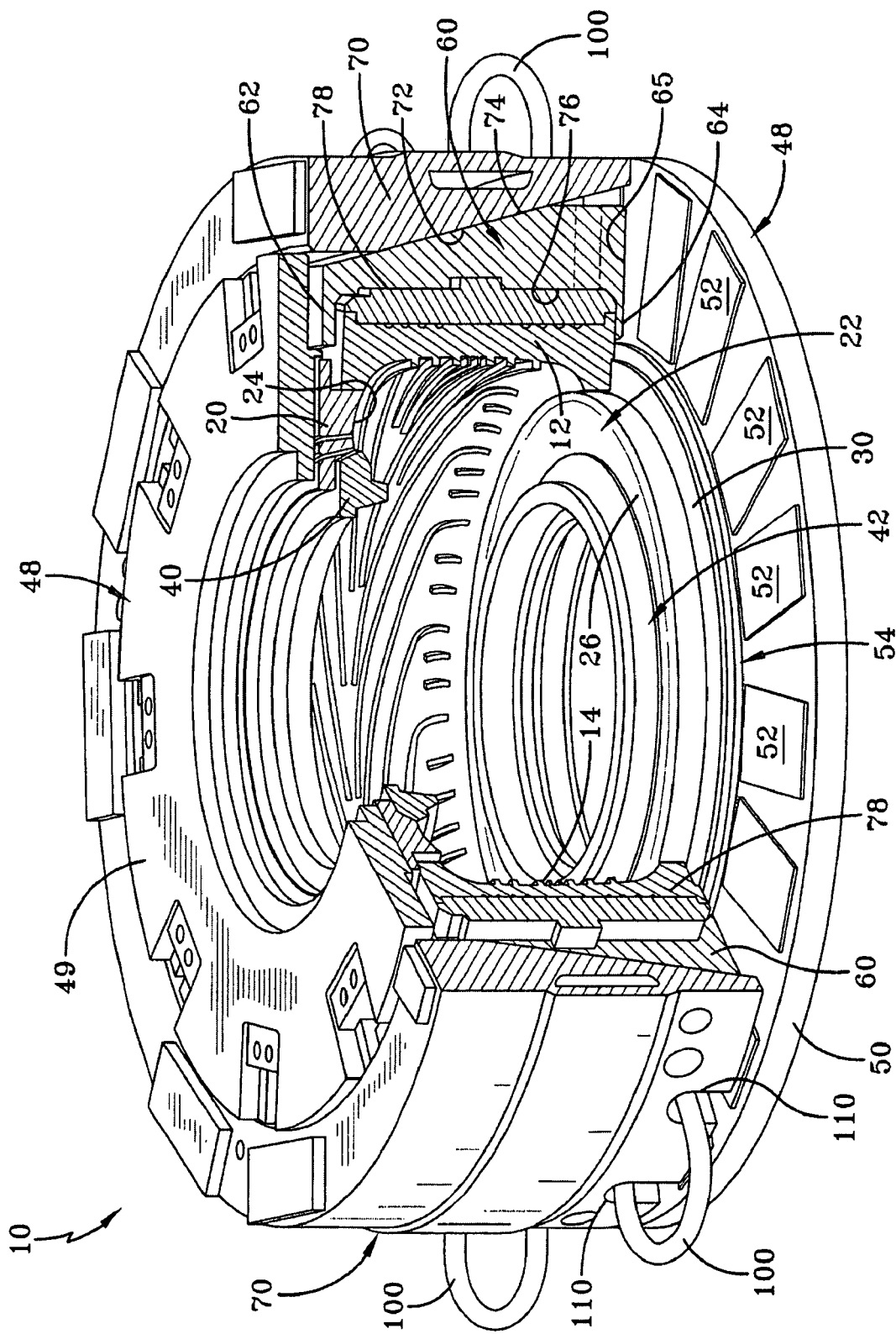
FIG. 2 is a partial cutaway view of the mold assembly of FIG. 1 additionally showing the outer container parts.
Figure 3:
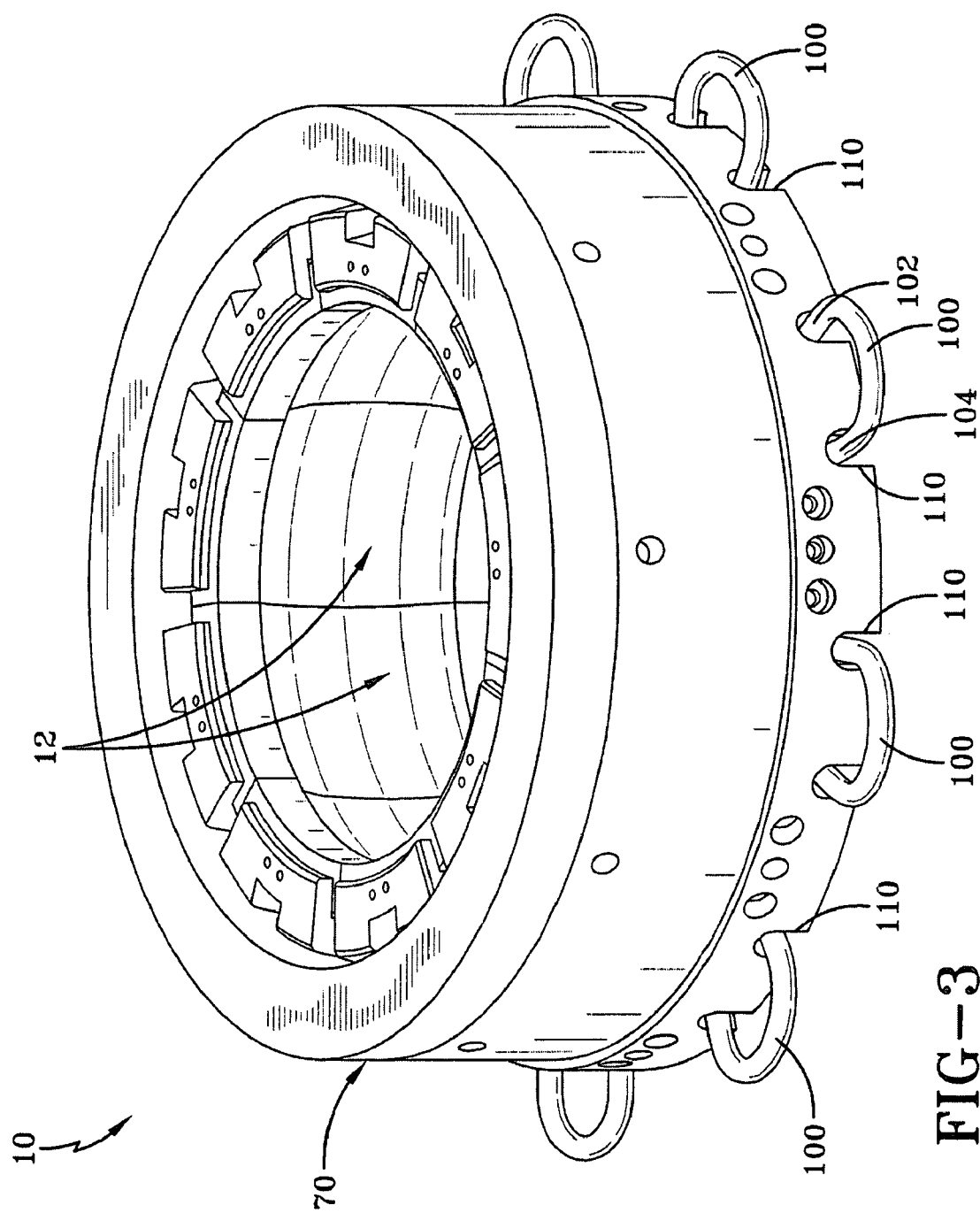
FIG. 3 is a perspective view of the entire mold assembly shown in the closed position.

The mold assembly 10 is typically housed in an optional container housing 70 as shown in FIG. 2. The container 70 typically includes a top and bottom container plate 49, 50 having a plurality of optional wear plates 52 thereon. The bottom container plate 50 has an inner annulus 54 for supporting the sidewall plate 22 and bead ring 42 thereon as shown in FIG. 2. The segments 12 are shown positioned about the sidewall plate 22. Surrounding the segments 12 are a plurality of slide blocks 60. The slide blocks 60 have flanged ends 62, 64 for receiving and supporting the segments 12 therein. The slide blocks 60 have a top and a bottom surface 63, 65 for contacting the container plates 49, 50 and wear plates 52. The slide blocks 60 are slidable in a radial direction. The container housing further comprises an annular actuating ring 70. The inner radial surface 72 of the actuating ring 70 is angled for engagement with an outer angled surface 74 of slide blocks 60. As the actuating ring 70 is lowered, the inner surface 72 of the actuating ring engages the outer surface 74 of slide blocks, causing the slide blocks to slide radially inward. The camming action of the actuator ring 70 moves the slide blocks 60 radially inward. As the slide blocks move radially inward, the radially inner surface 76 of the slide block engages the outer surface 78 of the adjacent segment, moving the segment radially inward as the actuating ring is lowered into position.

Figure 5:
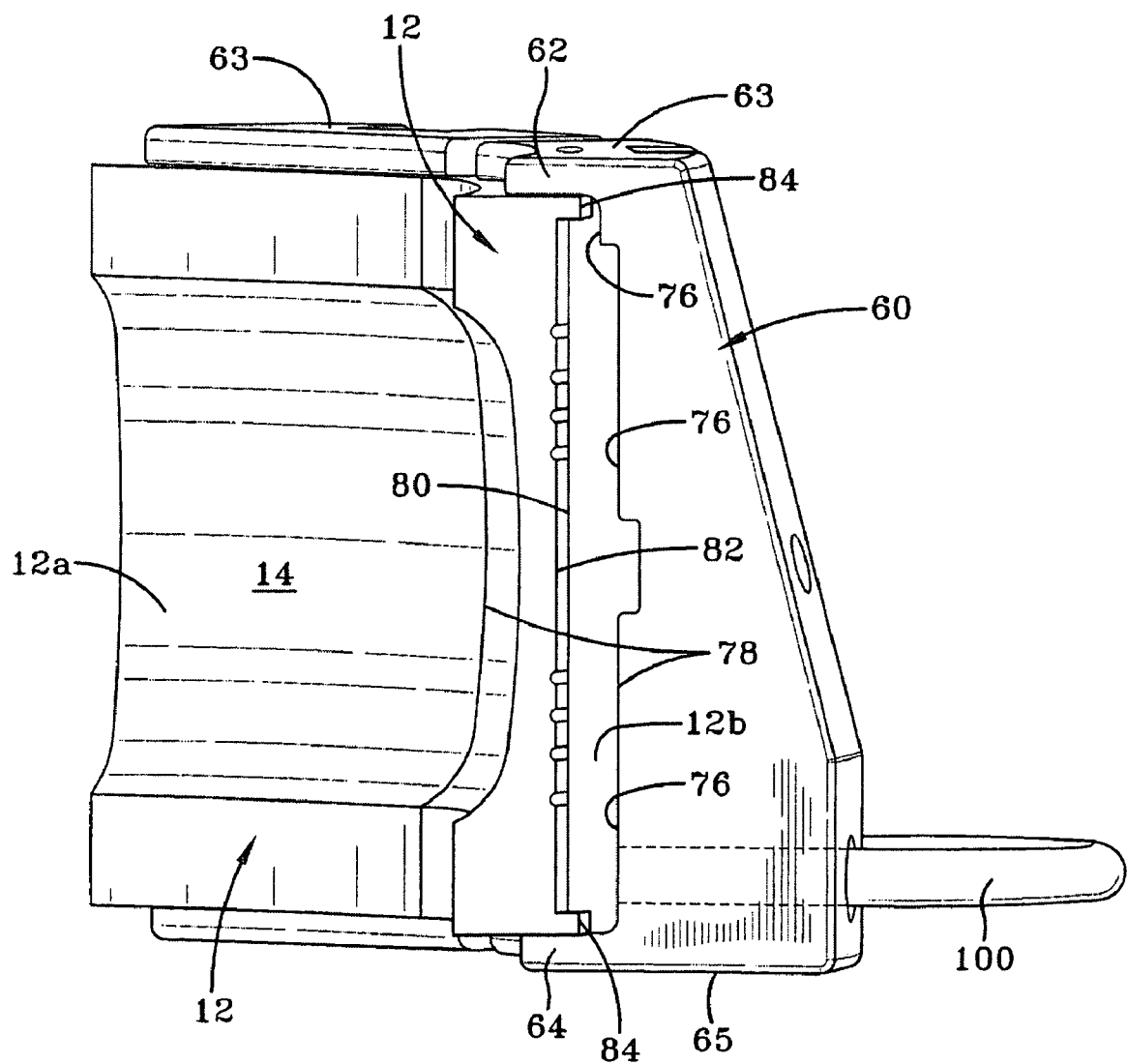
FIG. 5 is a cross-sectional view of a segment and slide block.
Figure 6:
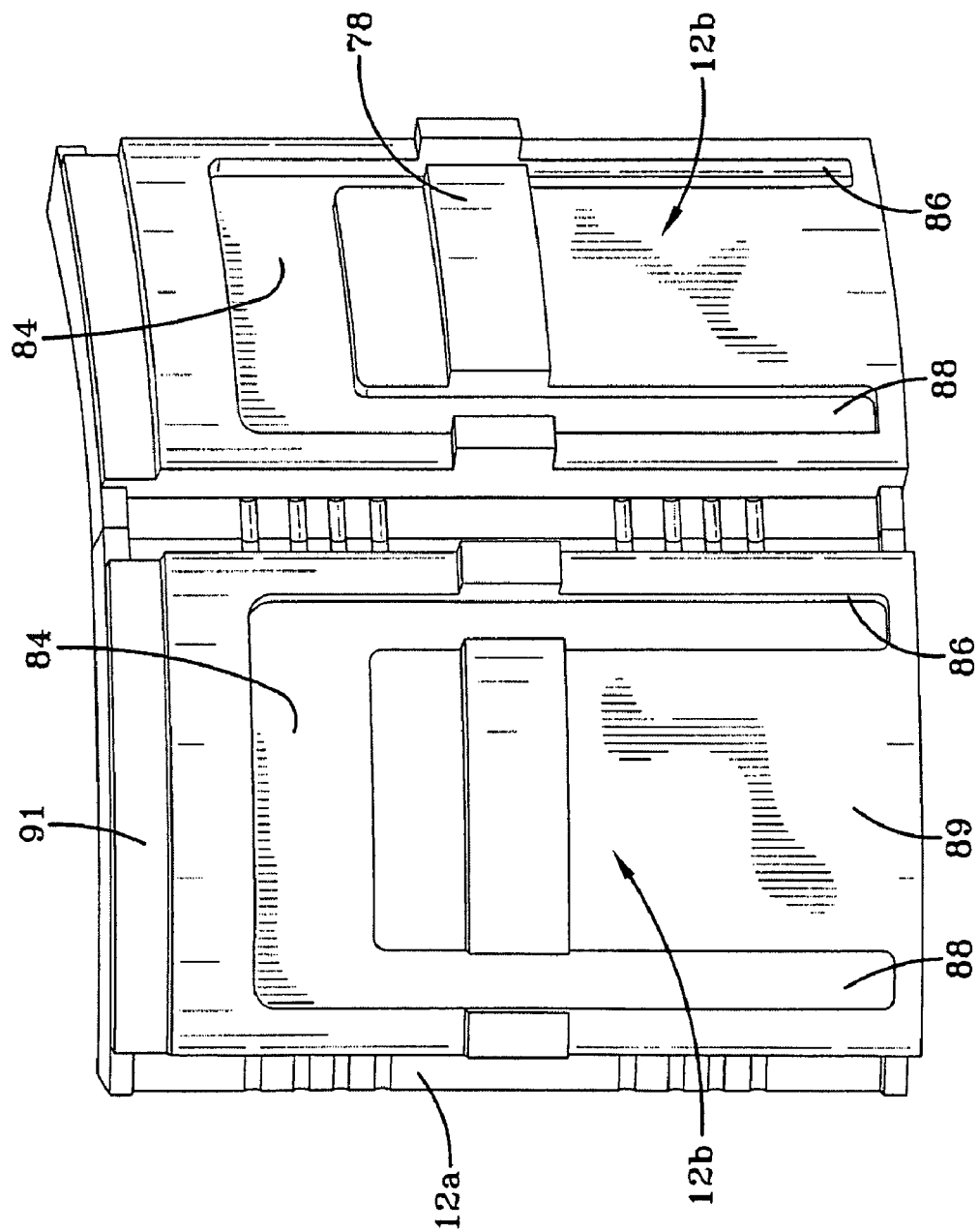
FIG. 6 is a rear view of two segments showing the channels.
Figure 7:
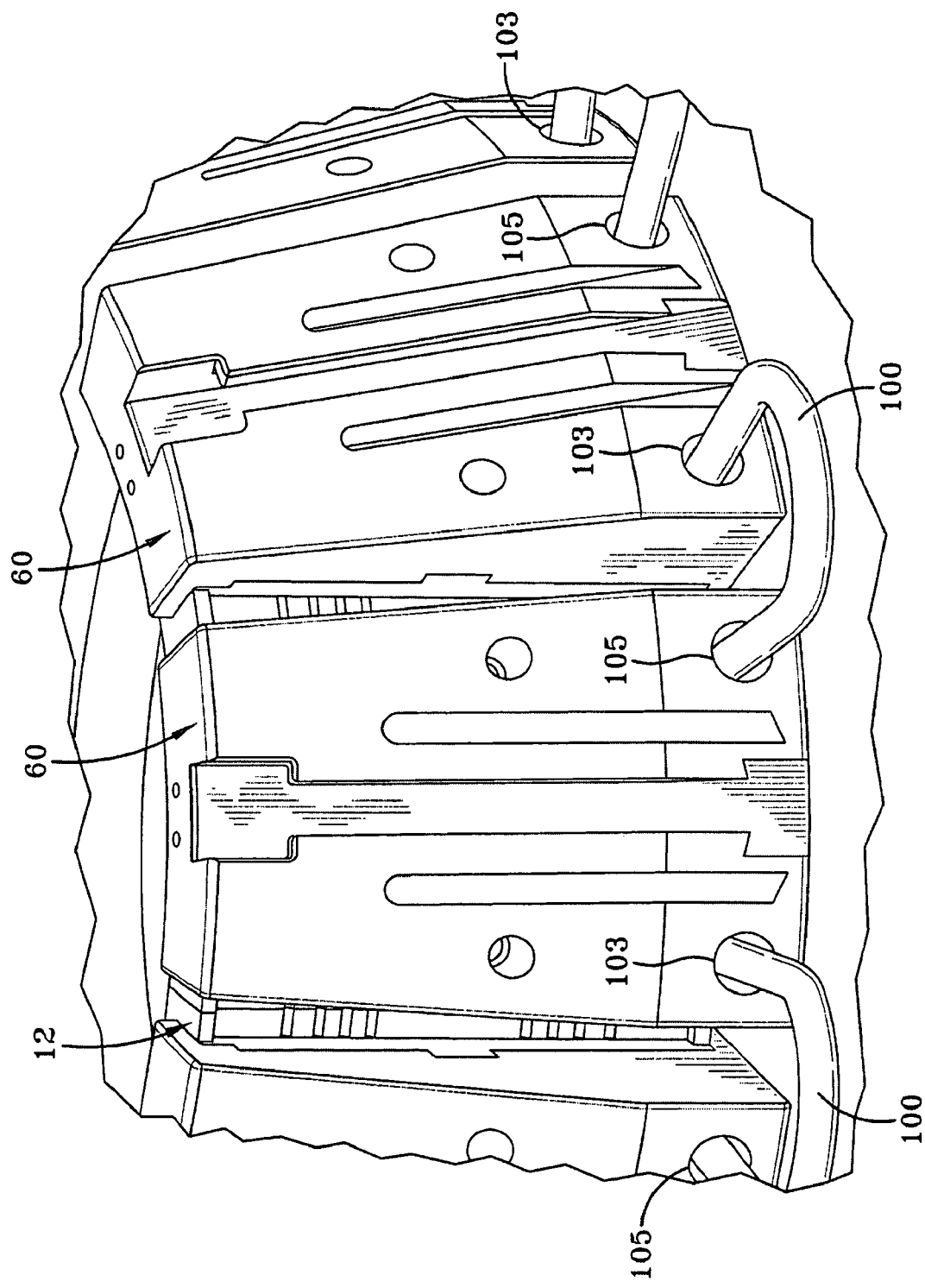
FIG. 7 is a rear view of a plurality of the slide blocks in the open position.

FIG. 5 illustrates a cross-sectional view of a tread mold segment 12 and the slide block 60 of the present invention. The mold segment 12 may be further subdivided into two components: a radially inner portion 12a and a radially outer portion 12b. The radially inner portion 12a has a radially inner mold surface 14 for forming the tread lands and grooves, and an outer surface 82 having flanged projections 84. The radially outer portion 12b has a radially inner surface 80 that mates with the radially outer surface 82 of the segment inner portion 12a. As shown in FIG. 6, the radially outer portion 12b has a radially outer surface 78 further comprising one or more channels 84 (hereinafter "channel"). The channel 84 cooperates with the inner surface 76 of the slide block 60 to form an enclosed fluid passageway. The fluid passageway has a first end 86 and a second end 88 which may function to be an inlet or outlet to the fluid passageway. The channel as shown in FIG. 6, extends in a first axial direction from an axially outer end 89 to an axially inner end 91, and then extends in a second, radial direction and then back in a third, axial direction from the axially inner end 91 to the axially outer end 91. Alternatively, there may be more than one channel. The channel may also traverse the segment from one end 89 to the other 91 in a zigzag or labyrinth manner, or in any pattern as desired. The segments 12a, b may also comprise a unitary piece with the one or more channels located on the outer surface 78 or located within the interior of the segment 12 (not shown).

Figure 4:
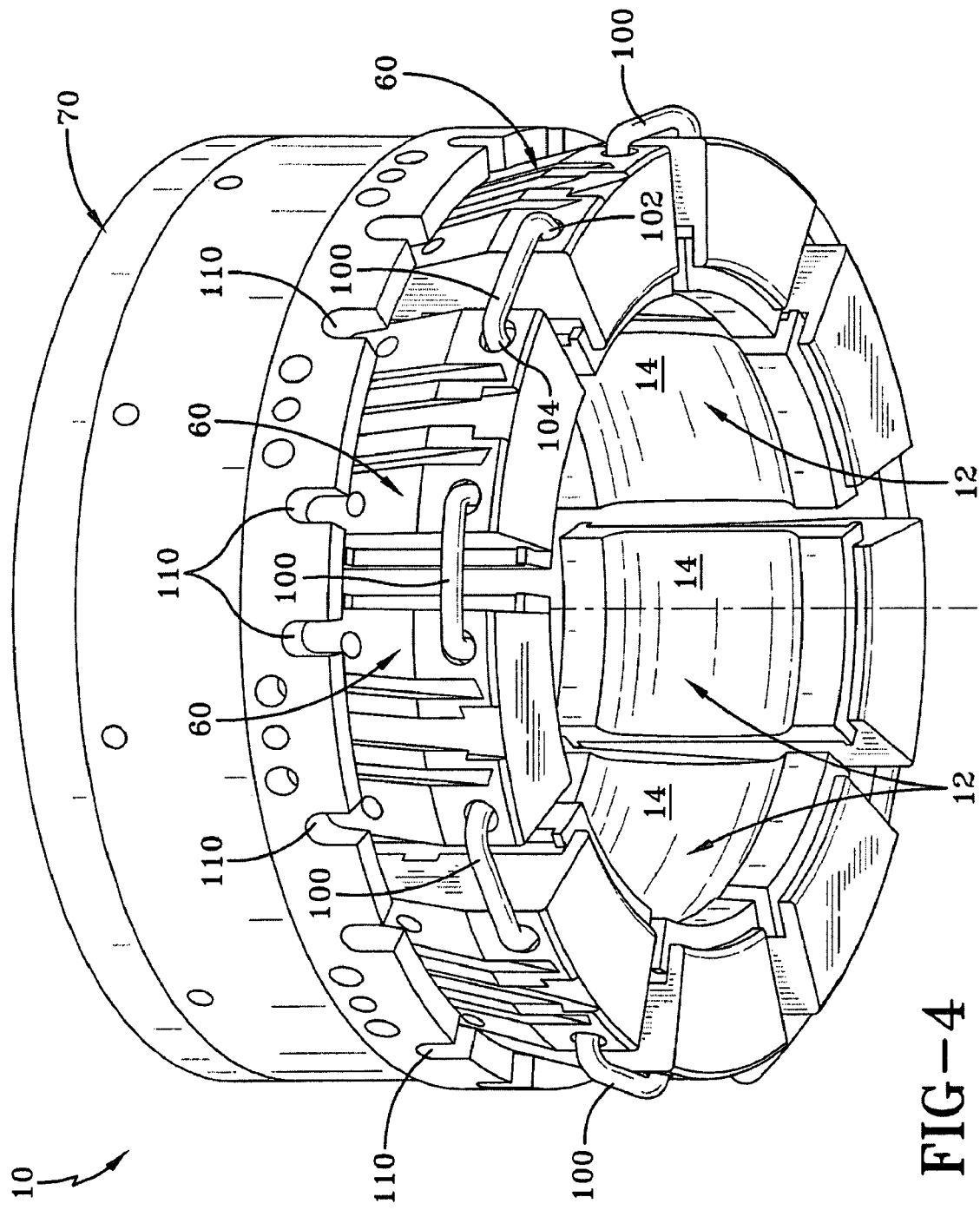
FIG. 4 is a perspective view of the entire assembly of FIG. 3, shown in the open position.

Each fluid passageway in a segment 12 which are formed by the one or more channels 84 are connected together with fluid passageways of adjacent segments 12 with a flexible connector 100. The connector has a first and second end 102, 104 that are received in bores 103, 105 of slide block 60. The first end 102 of the connector 100 is connected to the outlet port 88 of a first segment channel and the second end 104 of the connector connects to the inlet port of an adjacent, second segment channel. Preferably the connector 100 comprises flexible tubing which is more preferably insulated. The flexible tubing is sized to have a sufficient length to allow the segments to move apart as shown in FIG. 4. Stainless steel braided tubing is one example which may be utilized for the invention. Container 70 has slots 110 aligned to receive the connectors therein so that the tubing is not bent when closing the mold assembly.

The interconnected fluid passageways are in fluid communication with each other, forming a fluid manifold. The fluid manifold has an inlet and an outlet (not shown). Steam or other fluid medium may be circulated at the desired temperature in order to heat or cool the mold segments.

The invention reduces the thermal energy required during tire vulcanization by reducing the cycle time form warmup and cool down cycle. The invention provides this benefit by providing the heat source to the tread segments. As a result of bringing the heat source nearest the segments, the slide blocks can be made of cheaper materials such as ceramic or plastic instead of steel as there is no need for thermal conductivity between the actuating ring and the slide blocks.

While a certain representative embodiment and details have been shown for the purpose of illustrating the invention, it will be apparent to those skilled in the art that various changes and modifications may be made therein without departing from the spirit or scope of the invention.

What is claimed is:

1. A segmented mold comprising a plurality of segments arranged to form an annular cavity to mold a tire, the segments comprising an inner face for molding the tread, and an outer radial surface; the mold further comprising a plurality of slide blocks located radially outwards of the segments; wherein one or more channels are provided between each segment outer surface and the adjacent slide block inner surface forming a fluid passageway, wherein each fluid passageway is joined together by a fluid connector to form a fluid manifold for circulating a fluid medium.

2. The mold of claim 1 wherein the fluid connectors are tubular.

3. The mold of claim 1 wherein the channels are located on an outer surface of the segment.

4. A segmented mold comprising a plurality of segments arranged to form an annular cavity to mold a tire, the segments comprising an inner face for molding the tread, and an outer radial surface; the mold further comprising a plurality of slide blocks located radially outwards of the segments; each slide block having flanged ends and an inner cavity for receiving a segment therein; wherein one or more channels are provided between each segment outer surface and the adjacent slide block inner surface forming a fluid passageway, wherein each fluid passageway is joined together by a fluid connector to form a fluid manifold for circulating a fluid medium.

\* \* \* \* \*

UNITED STATES PATENT AND TRADEMARK OFFICE
CERTIFICATE OF CORRECTION

| | |
|---|---|
| PATENT NO. | : 7,540,730 B1 |
| APPLICATION NO. | : 12/259521 |
| DATED | : June 2, 2009 |
| INVENTOR(S) | : Yacine Ouyahia et al. |

It is certified that error appears in the above-identified patent and that said Letters Patent is hereby corrected as shown below:

On the Title Page, in Column 1, Lines 12 and [75] Inventors: change "Ouvahia" to --Ouyahia--

Signed and Sealed this

Twenty-first Day of July, 2009

JOHN DOLL
*Acting Director of the United States Patent and Trademark Office*